United States Patent

Frodsham

[15] 3,648,369

[45] Mar. 14, 1972

[54] EATING IMPLEMENT

[72] Inventor: Vaughn D. Frodsham, La Mirada, Calif.

[73] Assignee: Dudley Lyon, La Mirada, Calif. a part interest

[22] Filed: Mar. 9, 1970

[21] Appl. No.: 17,815

[52] U.S. Cl. ................................................. 30/141
[51] Int. Cl. ............................................... A47j 43/28
[58] Field of Search ................................. 30/141, 324

[56] References Cited

UNITED STATES PATENTS 1,606,038  11/1926  Norman .................................. 30/141
1,606,039  11/1926  Norman .................................. 30/141
1,666,106  4/1928  Norman .................................. 30/141
2,334,535  11/1943  Bandell ............................... 30/141 X Primary Examiner—Theron E. Condon
Assistant Examiner—J. C. Peters
Attorney—Wm. Jacquet Gribble

[57] ABSTRACT

A sipping straw has bonded to it a scoop for receiving and transferring food. The scoop may be a flat blade, a shaped bowl or a plurality of tines. Each scoop has a channel or groove along one of its axes with an adhesive layer in the groove to secure the scoop to the straw.

6 Claims, 5 Drawing Figures

PATENTED MAR 14 1972 3,648,369
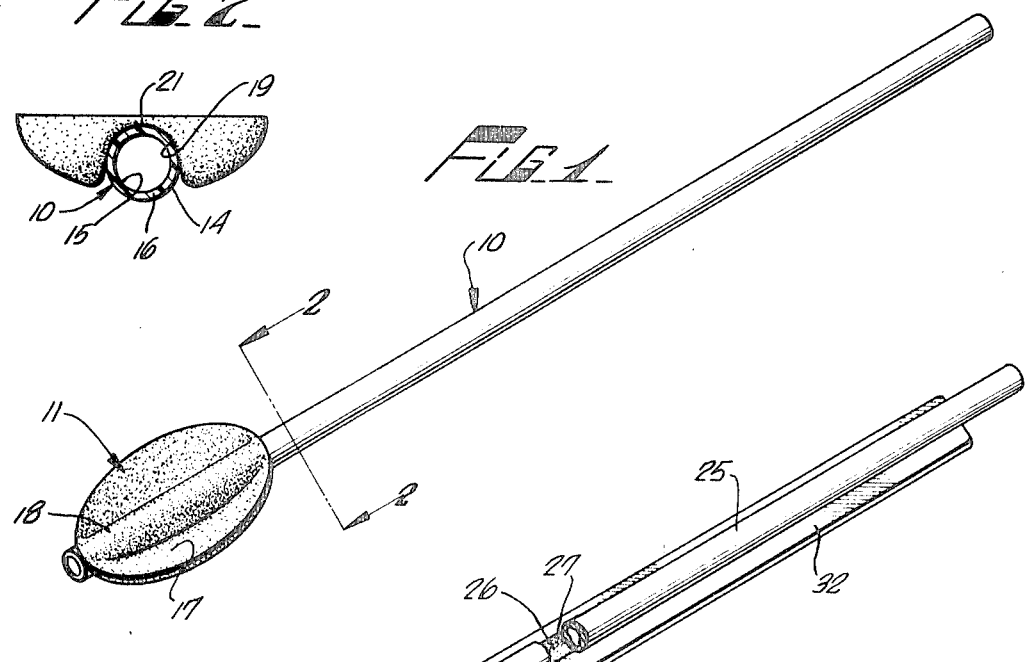
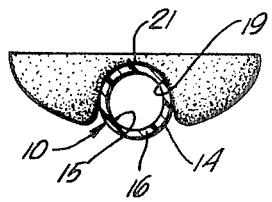
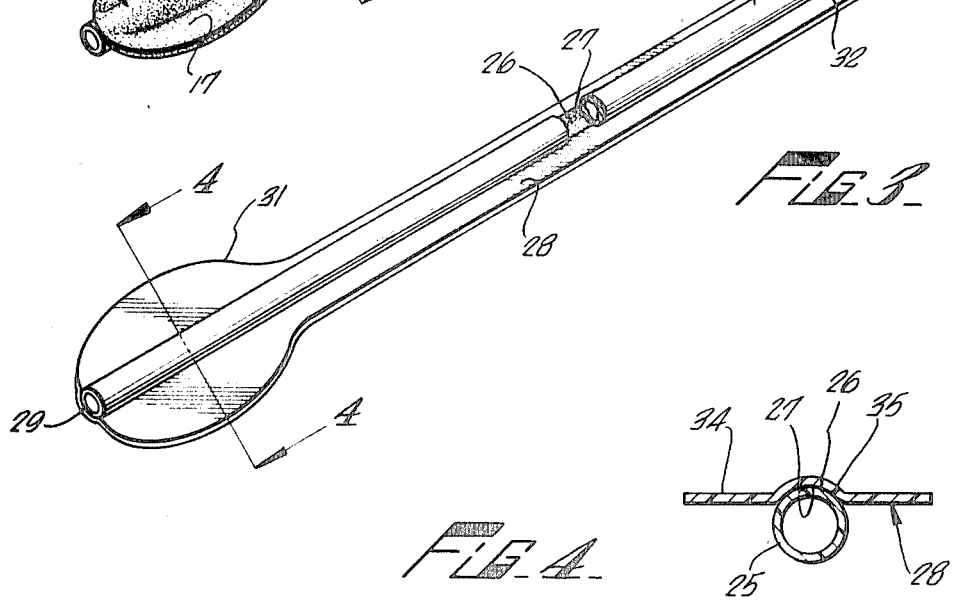
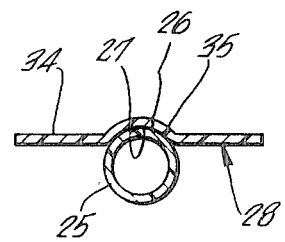
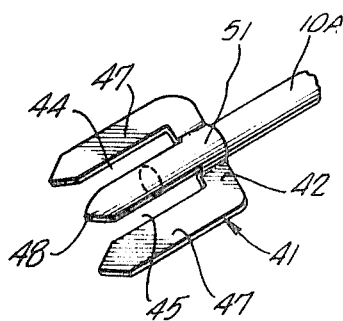
INVENTOR.
VAUGHN D. FRODSHAM
BY
W. J. Gribble
ATTORNEY

EATING IMPLEMENT

BACKGROUND OF THE INVENTION

The invention is related to eating implements for use with foods in which liquid and solid may be intermixed or combined. Such confections as ice cream sodas, malted milk shakes and the combination of partially melted ice and flavoring sometimes called "slush," are types of foods with which the implement of the invention can be used.

In foods of the type just described, it is conventional to use both a straw and a spoon. While the straws are not an important economic consideration, spoons of sufficient length to be effective are an item of expense to the seller of the foods mentioned. There are disposable spoons which are relatively inexpensive but when combined with the cost of the straw the expense is high. Reusable spoons may be used, but added to the initial cost of such items is the repetitive expense of washing and sterilizing such implements for food use. This problem has been recognized and metallic spoons with a tubular handle have been used. However, there are two drawbacks to the use of such an implement. The first is the fact that the tube cannot extend to the bottom of the container, since it terminates with the beginning of the spoon bowl. Secondly, the initial cost of the implement is sufficient to preclude its use as a disposable implement and the small tube is difficult to cleanse to the health standards imposed by most governmental agencies.

The eating implement of the invention overcomes these problems by combining a substantially conventional straw with an eating scoop in such a manner and from such materials that the implement is economically disposable after one use.

SUMMARY OF THE INVENTION

The invention contemplates an eating utensil which comprises a sipping straw and a food receiving scoop and an adhesive or other bond layer securing the scoop to the sipping straw. In a preferred embodiment the scoop is a shaped spoon bowl attached to an end of the sipping straw.

The sipping straw may be formed from plastic tubing such as polyethylene or polypropylene or, if necessary for rigidity, be of a plastic material such as high-impact polystyrene. By forming the bowls or tines in volume by vacuum-forming or injection-molding, the cost of the scoop element may be minimal. In one embodiment the scoop and the straw are coextensive, and such a combination may be formed by a continuous extrusion and assembly line technique wherein costs of assembly are very low. The resulting combination is one in which the implement has both dual utility and strength in addition to a low cost factor.

These and other advantages of the invention are apparent from the following description and drawing.

BRIEF DESCRIPTION OF THE DRAWING

FIG. 1 is a perspective view of an eating implement in accordance with the invention;

FIG. 2 is a sectional elevation taken along line 2—2 of FIG. 1;

FIG. 3 is a perspective view of the reverse side of an alternate embodiment of the invention;

FIG. 4 is a sectional elevation taken along line 4—4 of FIG. 3 and inverted; and FIG. 5 is a fragmentary perspective view of a further alternate embodiment of the invention having a scoop defined by tines.

DESCRIPTION OF THE PRESENTLY PREFERRED EMBODIMENT

The embodiment of FIGS. 1 and 2 comprises a tubular straw 10 to which a shaped spoon bowl 11 is attached. The straw has an outer periphery 14 of cylindrical configuration and a cylindrical inner passage 15 defined by a continuous wall 16.

The shaped spoon bowl 11, which acts as a scoop for any solids in the food being handled by the implement, has a concave bowl 17 divided by a raised ridge 18. The ridge adds stiffness to the spoon.

The reverse side of the ridge defines a channel or groove 19 (see FIG. 2) which has an adhesive layer 21 which may extend the length of the channel. The layer bonds the bowl scoop to the straw at an end of the straw. Preferably the spoon bowl and sipping straw terminate at about the same point.

The sipping straw may be of a high impact polystyrene such that the wall 16 is rigid under normal use. The bowl may also be of polystyrene and formed by either vacuum-forming or injection-molding. One suitable bonding agent for layer 21 for use with polystyrene has been ethylene dichloride.

The polystyrene is capable of accepting a wide range of color pigments such that the scoop and sipping straw may be in either harmonizing or contrasting colors, depending on the taste of the buyer. With the straw and scoop ends being coterminous the last portions of the food remaining in the container may be removed either through the straw or with the scoop.

The embodiment of FIGS. 3 and 4 comprises a sipping straw 25 and a bonding layer 26 in a channel 27 on the reverse side of a scoop 28 which the layer adheres to the straw. The scoop is coextensive with the straw and the two terminate at a lower end 29.

The scoop has a platform portion 31 and a handle portion 32. The channel 27 extends through both portions. The obverse surface 34 of the scoop is substantially planar except for the axial ridge 35 formed by an opposite wall 36 of channel 27. In the embodiment of FIG. 3, the straw may be of a relatively thin-walled material, such as polyethylene, which is obtainable in rolls. A blank the width of the scoop platform may be extruded continuously with the channel formed by the extruding die. The straw may be fed from the roll and combined with the extruded scoop in a continuous operation wherein the adhesive is continuously applied to the channel just prior to the joining of the straw with the extruded scoop material. The adhesive layer 26 within the channel may be continuous or discontinuous, depending upon the materials of the straw and scoop. After the straw and the scoop blank are joined, the individual eating implements may be punched from the scoop blank with any scrap being salvagable for reextrusion.

The embodiment of FIG. 3 utilizes the scoop material for the rigidity necessary to use the implement as a spoon. The straw may need such a backing for use with foodstuffs of relatively high viscosity.

The embodiment of FIG 5 comprises a sipping straw 10A which is of relatively rigid material. The straw has attached to it a scoop 41 which may be of an injection-molded plastic.

The scoop 41 has a base portion 42 which is bifurcated at 44 and 45 to define two outer tines 47 and an inner tine 48. The inner tine and the median portion of the base define a channel, the ridge 51 of which is visible in FIG. 5, which overlies an end of the straw and contains an adhesive layer (not shown) similar to that shown and described with respect to the embodiment of FIG. 1. The end of the straw may terminate a short interval from the end of the inner tine 48 defined by the bifurcations such that the inner tine as well as the outer tines has some effectiveness in stabbing solids within the food being consumed.

The above-described embodiments represent but a few of the variations within the scope of the invention. The plastic and adhesive materials given as specific examples merely exemplify some of the materials adapted to economical fabrication and use with foodstuffs. It is therefore my desire that the foregoing embodiments be regarded as illustrative only and that the scope of the invention be defined by the appended claims.

I claim:

1. An eating utensil comprised of separate components including a tubular sipping straw, a food-receiving scoop, and an adhesive layer securing the separate straw and scoop together, said scoop and straw being coterminous at the food-receiving ends thereof.

2. An eating utensil in accordance with claim 1 wherein the straw includes a rigid wall defining a utensil handle.

3. An eating utensil in accordance with claim 1 wherein the scoop comprises a bowl having a channel along one axis, said bowl being secured to said straw at said channel.

4. An eating utensil in accordance with claim 1 wherein the scoop comprises a wide, food-retaining portion, an elongate narrow handle portion, and a straw-receiving channel extending the length of both said portions.

5. An eating utensil in accordance with claim 1 wherein the scoop comprises a bifurcated food-receiving portion, and a channel in said portion in which the straw is secured.

6. An eating utensil in accordance with claim 5 wherein the bifurcated portion has two bifurcations, with the portion between bifurcations defining a channel which the adhesive secures to an end of the sipping straw.

* * * * *